(12) United States Patent
Lienhart et al.

(10) Patent No.: US 7,197,658 B2
(45) Date of Patent: Mar. 27, 2007

(54) SYNCHRONIZING SAMPLES OF A MULTIMEDIA STREAM WITH A SYSTEM CLOCK

(75) Inventors: Rainer W. Lienhart, Santa Clara, CA (US); Igor V. Kozintsev, San Jose, CA (US); Dmitry N. Budnikov, Nizhny Novgorod (RU); Igor V. Chikalov, Nizhny Novgorod (RU); Sergey A. Egorychev, Dzerzhinsk (RU)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 10/751,035

(22) Filed: Dec. 31, 2003

(65) Prior Publication Data

US 2005/0144496 A1 Jun. 30, 2005

(51) Int. Cl.
*G06F 1/12* (2006.01)
(52) U.S. Cl. ...................... 713/400; 713/500
(58) Field of Classification Search ............... 713/400
See application file for complete search history.

(56) References Cited

U.S. PATENT DOCUMENTS

| | | | | |
|---|---|---|---|---|
| 4,021,784 A | * | 5/1977 | Kimlinger | 713/401 |
| 5,689,689 A | * | 11/1997 | Meyers et al. | 713/375 |
| 5,794,019 A | * | 8/1998 | Genduso et al. | 713/400 |
| 6,246,325 B1 | * | 6/2001 | Chittipeddi | 340/540 |
| 6,279,058 B1 | * | 8/2001 | Gulick | 710/58 |
| 6,490,256 B1 | * | 12/2002 | Jones et al. | 370/277 |
| 6,904,536 B2 | * | 6/2005 | Hasegawa | 713/400 |
| 6,906,741 B2 | * | 6/2005 | Canova et al. | 348/14.08 |
| 6,937,680 B2 | * | 8/2005 | Fong et al. | 375/357 |
| 6,965,590 B1 | * | 11/2005 | Schmidl et al. | 370/343 |
| 7,030,812 B2 | * | 4/2006 | Bekritsky et al. | 342/387 |
| 2004/0125822 A1 | * | 7/2004 | Jun et al. | 370/503 |
| 2005/0228902 A1 | * | 10/2005 | Lienhart et al. | 709/248 |

* cited by examiner

*Primary Examiner*—Chun Cao
(74) *Attorney, Agent, or Firm*—Blakely, Sokoloff, Taylor & Zafman LLP

(57) ABSTRACT

According to one embodiment of the present invention, a novel method and system are disclosed. In one embodiment, an I/O device of a system receives or outputs a multimedia stream, the I/O device having a I/O clock and the system having a system clock. Samples from the multimedia stream are synchronized with the system clock.

24 Claims, 5 Drawing Sheets

SYNCHRONIZING SAMPLES OF A MULTIMEDIA STREAM WITH A SYSTEM CLOCK

NOTICE OF RELATED APPLICATIONS

This application is related to application Ser. No. 10/749,989, entitled "Method and System for Synchronizing Platform Clocks In A Distributed Wireless Platform", filed on Dec. 31, 2003, and application Ser. No. 10/754,977, entitled Apparatus and Method for Adaptation of Time Synchronization of a Plurality of Multimedia Streams, filed on Jan. 9, 2004, which applications are assigned to the assignee of the present application.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of distributed multimedia synchronization. More particularly, an embodiment of the present invention relates to synchronizing multimedia I/O with the CPU clock.

One approach to provide additional computing power has been to utilize distributed computer environments. This approach enables several computers to collaboratively perform computational tasks within a reduced amount of time. Generally, the divide and conquer approach provided by such parallel computing approaches enables utilization of available personal computers, rather than purchasing of a high performance, server-based computer system for performing the computationally intensive tasks.

Distributed computing has generally, however, been applied to performing purely computational tasks and not to synchronized capture and/or processing of signals, especially audio/video signals (and data streams). Signal processing of audio/video signals (and data streams) are generally very sensitive to even very small differences in sampling rates (e.g., clock skew), jitter, and delays. Therefore, precise synchronization is very critical for high quality input/output processing, as well as for real-time performance and in general, robustness and reliability issues. But, precise capture and synchronized inputs are not guaranteed on current platforms.

For example, on the same personal computer (PC) platform, problems can arise when several input/output (I/O) devices are used to capture audio and visual information from video camera(s) and microphone(s). Due to the fact that the different I/O devices will be triggered by separate oscillators, resulting audio samples and video frames will not be aligned on an absolute time line (thus inducing some relative offsets). Moreover, due to differences in the oscillators' frequencies, audio and/or visual data will drift away across multiple channels/streams over time. Instabilities in the oscillators' frequencies will also not be perfectly correlated between each other.

Similarly, in the case of multiple PC platforms audio and visual I/O devices will not be synchronized in time scale inducing some relative offsets and data samples to drift relative to each other. The extent of the relative offset, drift, and jitter on the existing platforms depends on many hardware and software parameters and can be very significant, sometimes causing total degradation of the processed signals (from the non-synchronized input streams). Such drifts, delays, and jitters can cause significant performance degradation for instance for array signal processing algorithms.

For example, in an acoustic beam former with 10 centimeter (cm) spacing between microphones, an error of only 0.01 percent in time can cause error of 20 degrees in the beam direction. Due to this fact, current implementations of audio array process algorithms may rely on dedicated circuitry for the synchronization between multiple I/O channels. Unfortunately, implementing such an approach with existing PC platforms would require a major overhaul of the current hardware utilized by the PC platforms. Therefore, there remains a need to overcome one or more of the limitations in the above-described existing art.

BRIEF DESCRIPTION OF THE DRAWINGS

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Also, the use of the term general purpose computer (GPC) herein is intended to denote laptops, PDAs, tablet PCs, mobile phones, and similar devices that can be a part of a distributed audio/visual system.

Figure 1:
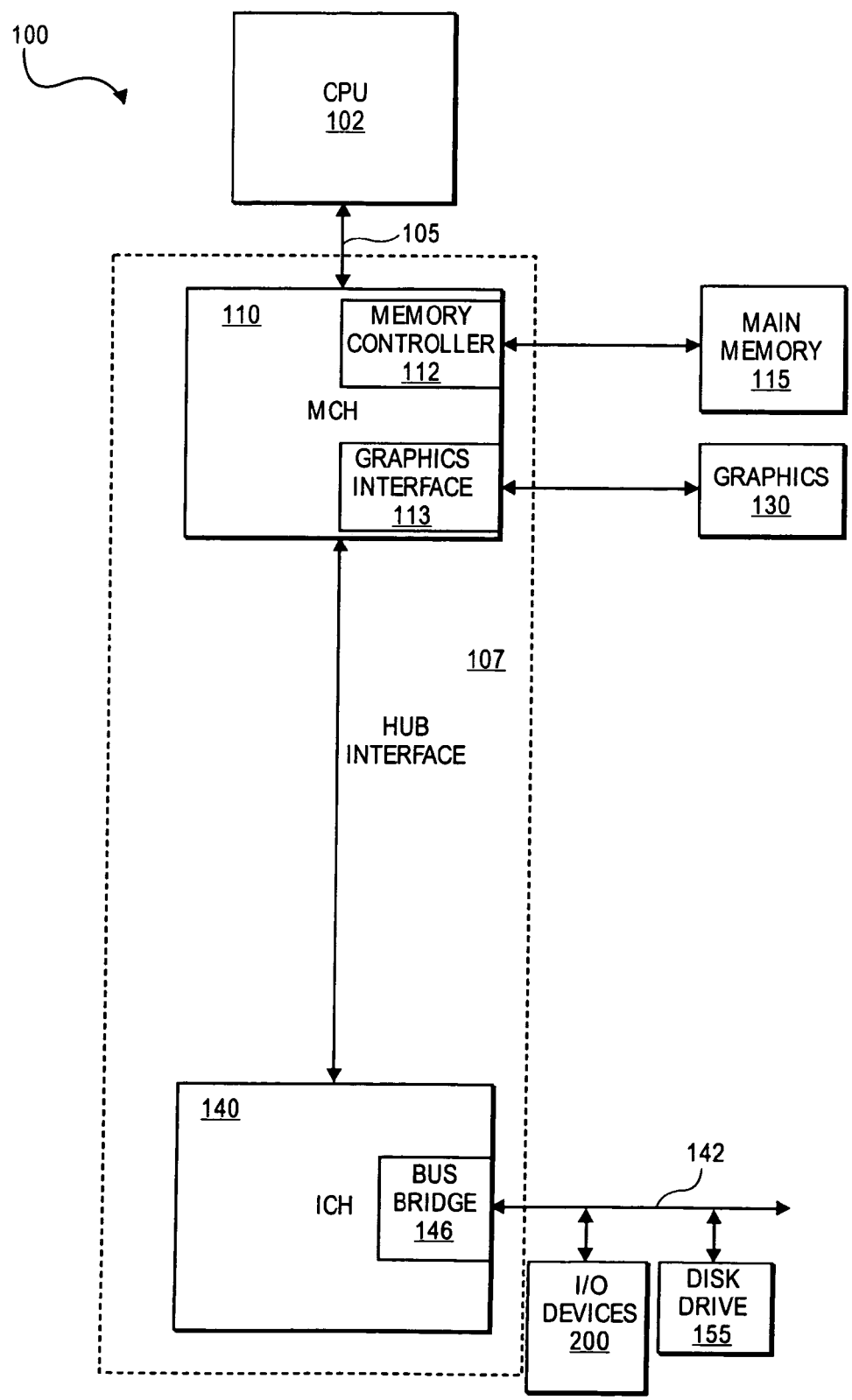
FIG. 1 illustrates an exemplary block diagram of a computer system 100 in which one embodiment of the present invention may be implemented.

FIG. 1 illustrates an exemplary block diagram of a computer system 100 in which one embodiment of the present invention may be implemented. The computer system 100 includes a central processing unit (CPU) 102 coupled to a bus 105. In one embodiment, the CPU 102 is a processor in the Pentium® family of processors including the Pentium® II processor family, Pentium® III processors, Pentium® IV processors available from Intel Corporation of Santa Clara, Calif. Alternatively, other CPUs may be used, such as Intel's XScale processor, Intel's Pentium M Processors, ARM processors available from ARM Ltd. of Cambridge, the United Kingdom, or OMAP processor (an enhanced ARM-based processor) available from Texas Instruments, Inc., of Dallas, Tex.

A chipset 107 is also coupled to the bus 105. The chipset 107 includes a memory control hub (MCH) 110. The MCH 110 may include a memory controller 112 that is coupled to a main system memory 115. Main system memory 115 stores data and sequences of instructions that are executed by the CPU 102 or any other device included in the system 100. In one embodiment, main system memory 115 includes dynamic random access memory (DRAM); however, main system memory 115 may be implemented using other memory types. Additional devices may also be coupled to the bus 105, such as multiple CPUs and/or multiple system memories.

The MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif. In an embodiment of the present invention, a flat panel display may be coupled to the graphics interface 113 through, for example, a signal converter that translates a digital representation of an image stored in a storage device such as video memory or system memory into display signals that are interpreted and displayed by the flat-panel screen. It is envisioned that the display signals produced by the display device may pass through various control devices before being interpreted by and subsequently displayed on the flat-panel display monitor. The display device may be a liquid crystal display (LCD), a flat panel display, a plasma screen, a thin film transistor (TFT) display, and the like.

In addition, the hub interface couples the MCH 110 to an input/output control hub (ICH) 140 via a hub interface. The ICH 140 provides an interface to input/output (I/O) devices within the computer system 100. In one embodiment of the present invention, the ICH 140 may be coupled to a Peripheral Component Interconnect (PCI) bus adhering to a Specification Revision 2.1 bus developed by the PCI Special Interest Group of Portland, Oreg. Thus, the ICH 140 includes a bus bridge 146 that provides an interface to a bus 142. In one embodiment of the present invention, the bus 142 is a PCI bus. Moreover, the bus bridge 146 provides a data path between the CPU 102 and peripheral devices.

The bus 142 includes I/O devices 200 (which are further discussed with reference to FIG. 2) and a disk drive 155. However, one of ordinary skill in the art will appreciate that other devices may be coupled to the PCI bus 142. In addition, one of ordinary skill in the art will recognize that the CPU 102 and MCH 110 may be combined to form a single chip. Furthermore, graphics accelerator 130 may be included within MCH 110 in other embodiments.

In addition, other peripherals may also be coupled to the ICH 140 in various embodiments of the present invention. For example, such peripherals may include integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Moreover, the computer system 100 is envisioned to receive electrical power from one or more of the following sources for its operation: a power source (such as a battery, fuel cell, and the like), alternating current (AC) outlet (e.g., through a transformer and/or adaptor), automotive power supplies, airplane power supplies, and the like.

Figure 2:
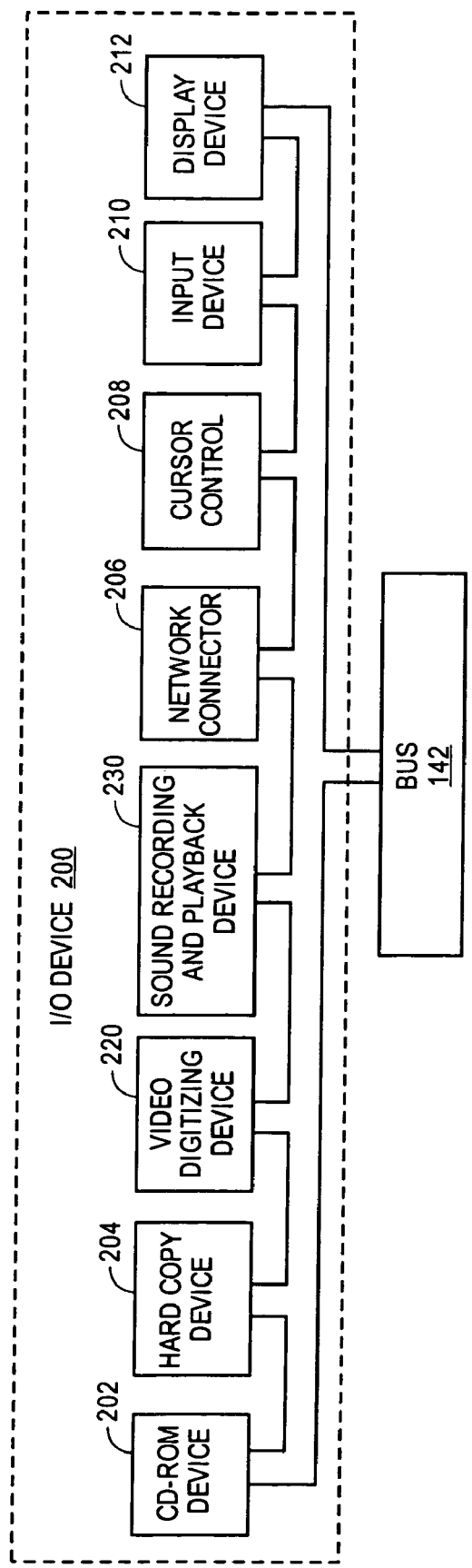
FIG. 2 further illustrates the I/O devices 200 of the computer system 100 as depicted in FIG. 1.

FIG. 2 further illustrates I/O devices 200 of the computer system 100 as depicted in FIG. 1. As illustrated, the computer system 100 may include a display device 212 such as a monitor. The display device 212 may include an intermediate device such as a frame buffer. The computer system 100 also includes an input device 210 such as a keyboard and a cursor control 208 such as a mouse, trackball, or track pad. The display device 212, the input device 210, and the cursor control 208 are coupled to bus 142. The computer system 100 may include a network connector 206 so that computer system 100 may be connected as part as a local area network (LAN) or a wide area network (WAN) such as, for example, the Internet.

Additionally, the computer system 100 can also be coupled to a device for sound recording and playback 230 such as an audio digitization device coupled to a microphone for recording voice input for speech recognition or for recording sound in general. The I/O devices 200 of computer system 100 may also include a video digitizing device 220 that can be used to capture video images alone or in conjunction with sound recording device 230 to capture audio information associated with the video images. Furthermore, the input devices 200 may also include a hard copy device 204 (such as a printer) and a CD-ROM device 202. The input devices 200 (202–212) are also coupled to bus 142.

Accordingly, the computer system 100 as depicted in FIG. 1 may be utilized to capture multimedia data including, for example, audio and/or video data from a selected scene, environment, or the like. Currently, many individuals utilize personal computers (PCs) such as depicted in FIG. 1 in order to capture live audio/video data (multimedia scene data) through, for example, a camera coupled to a port of computer system 100 (not shown) such as, for example, a USB port or a firewire port (IEEE 1394). This data is then provided as a streaming media format (Multimedia Stream Data) including, but not limited to, Microsoft® advanced steaming format (ASF) files, motion picture experts group (MPEG) standards such as MPEG-1/2/4, and audio layer-3 (MP3) files, Real Audio G2 files, QDesign2 files, or the like.

In one embodiment of the present invention, an audio capture device such as a microphone may be utilized by the computer system 100 to capture audio information associated with the captured multimedia scene data. Accordingly, as individuals attempt to utilize their personal computers in order to capture, for example, live audio/video data, it is generally recognized that audio/video data is most effectively captured utilizing one or more data capture devices.

With reference to FIGS. 1 and 2, the I/O devices (except AGP display adapters) are generally connected to the ICH (I/O hub) via dedicated or shared buses. The PCI bus can be a way to connect various audio, video, and networking devices to the ICH. These devices typically have their own crystal oscillators and clocks that are not synchronized to each other, and to the CPU clock. This means, for example, that if audio and video samples are captured using separate I/O cards, they can go out of sync as time passes by.

Unfortunately, the time it takes for a block of data to travel between I/O device, main memory, and CPU is variable and depends on many factors like the CPU load, cache state, activity of other I/O devices that share the bus, and the operating system behavior. Therefore, applications that process data have no way to know precisely the time the data enters or leaves the I/O devices. The propagation delay may range from nanoseconds to milliseconds depending on the conditions mentioned above.

In existing applications, multiple video and audio streams are usually captured using a single I/O device such as a multi-channel analog to digital (A/D) or audio/video (A/V) capture cards. Special methods are needed to use multiple I/O devices synchronously even on a single PC platform.

The situation becomes more complex when synchronization of I/O devices on separate platforms is desired. There, in addition to I/O-CPU latencies, network connection introduces additional delays, that are variable due to best-effort (and therefore variable transmission delay) type of Media Access Protocols used in existing wired and wireless Ethernet.

Overview of the Synchronization Variations

Figure 3A:
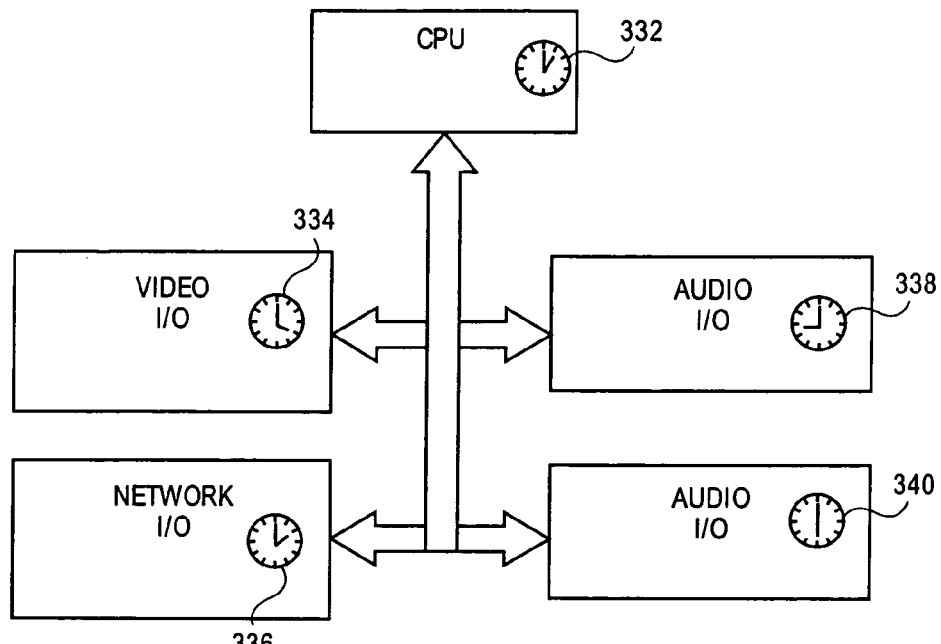
FIG. 3a illustrates a General Purpose Computing platform with a main CPU clock and separate clocks on each peripheral device.

FIG. 3a illustrates a typical GPC platform with the main CPU clock 332 and separate clocks 334, 336, 338, 340 on each peripheral device. In one embodiment, to provide I/O stream synchronization a linear transition model is generated for each peripheral device, which relates the stream offset (that is the sample number in the audio stream) to the value of the CPU clock counter (RDTSC). As described herein, I/O stream and multimedia stream are referenced interchangeably.

In one embodiment, let t be a value of the CPU clock and $\tau_i$ the sample number that was recorded/played at time t with the i-th device. The model then has the following form: $t(\tau_i) = a_i(t)\tau_i + b_i(t)$, where $a_i(t)$ and $b_i(t)$ is the timing model parameter for the i-th device. In one embodiment, the dependency of the model parameter on time approximates instabilities in the clock frequency due to temperature variations and other factors. In one embodiment, the model can have the inverse form: $\tau_i(t) = a_i(\tau_i)t + b_i(\tau_i)$, t is a value of the system clock and $\tau_i$ is a sample number of the multimedia stream at time t with a i-th device, and $a_i(\tau_i)$ and $b_i(\tau_i)$ is the timing model parameter for the i-th device. In one embodiment, the synchronization of the I/O stream is divided into two parts: learn transition model coefficients $a_i(t)$ and $b_i(t)$, and shift and resample streams according to transition model.

Figure 3B:
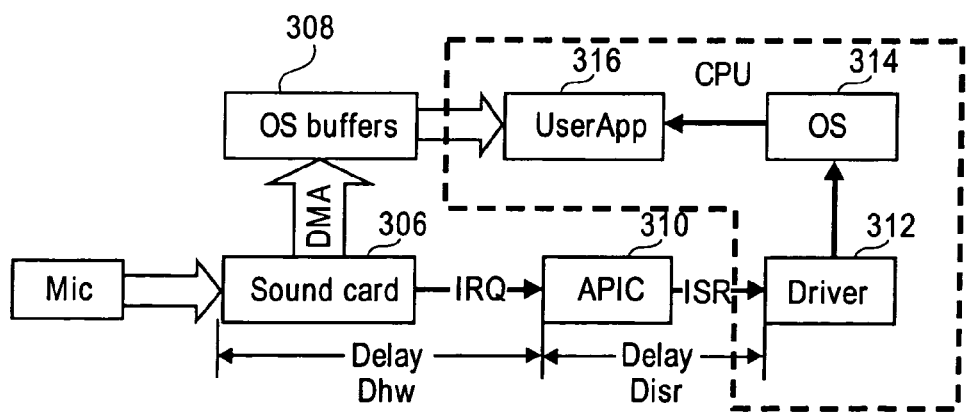
FIG. 3b illustrates a diagram of a system for processing multimedia streams.

A brief description is provided describing the synchronization operations and timing relationships on a GPC during audio capture, as illustrated in FIG. 3b, in accordance with one embodiment. Audio output would follow a similar routine.

Incoming audio packets are received and processed by a hardware device 306 (e.g., network card), and eventually is put into a Direct Memory Access (DMA) buffer 308. The time for the hardware component is modeled in FIG. 3b by the delay $d_{hw}$, which is approximately constant for similar hardware modules.

A DMA controller transfers the data to a memory block allocated by the system and signals the event to the CPU by an Interrupt ReQuest (IRQ). The stage issuing the IRQ introduces variable delay due to memory bus arbitration between different agents (i.e., CPU, graphics adapter, other DMA's).

The interrupt controller (APIC) 310 queues the interrupt and schedules a time slot for handling. Because APIC is handling requests from multiple devices, this stage introduces variable delay. Both previous stages are modeled by $d_{isr}$ in FIG. 3b. The Interrupt Service Routine (ISR) of the device driver 312 is called, and the driver 312 sends notification to the Operating System (OS) 314. The OS delivers a notification and data to the user application(s) 316.

As described above, the data packet traverses multiple hardware and software stages in order to travel from network adapter to the CPU and back. The delay introduced by the various stages is highly variable making the problem of providing a global clock to the GPCs a very complicated one.

Synchronizing Multimedia Device and CPU Clock

A description of synchronizing a multimedia device and a CPU clock, in accordance with one embodiment, is provided. In one embodiment, the ISR of the multimedia driver timestamps samples in the OS buffer using the CPU clock to form a set of observation pairs $(t^j, \tau_i^j)$. In one embodiment, j represents the index of the transferred multimedia buffer. $t^j$ represents the value of the CPU clock at the time of the j-th transfer, and $\tau_i^j$ represents the sample number of the last/first sample in the buffer that was transferred at time $t^j$ for the i-th device for input/output, in accordance with one embodiment.

In accordance with the description accompanying FIG. 3b, $t^j$ can be obtained from $t^j = +t^j + d_{hw} + d_{isr}$, which may further be modeled as $t^j = t^j + d + n$. In one embodiment, d models all constant delay components and n represents the stochastic component. Given the set of observations $(t^j, \tau_i^j)$, in one embodiment, an estimate is generated for the timing model parameters $a_i$ and $b_i$ for all peripheral devices.

In one embodiment, the values of $a_i$ and $b_i$ are generated using a least trimmed squares (LTS) regression. In one embodiment, LTS is equivalent to performing least squares fit, trimming the observations that correspond to the largest residuals (i.e., defined as the distance of the observed value to the linear fit), and then computing a least squares regression model for the remaining observations.

Streams Adjustment and Resampling

Figure 4A:
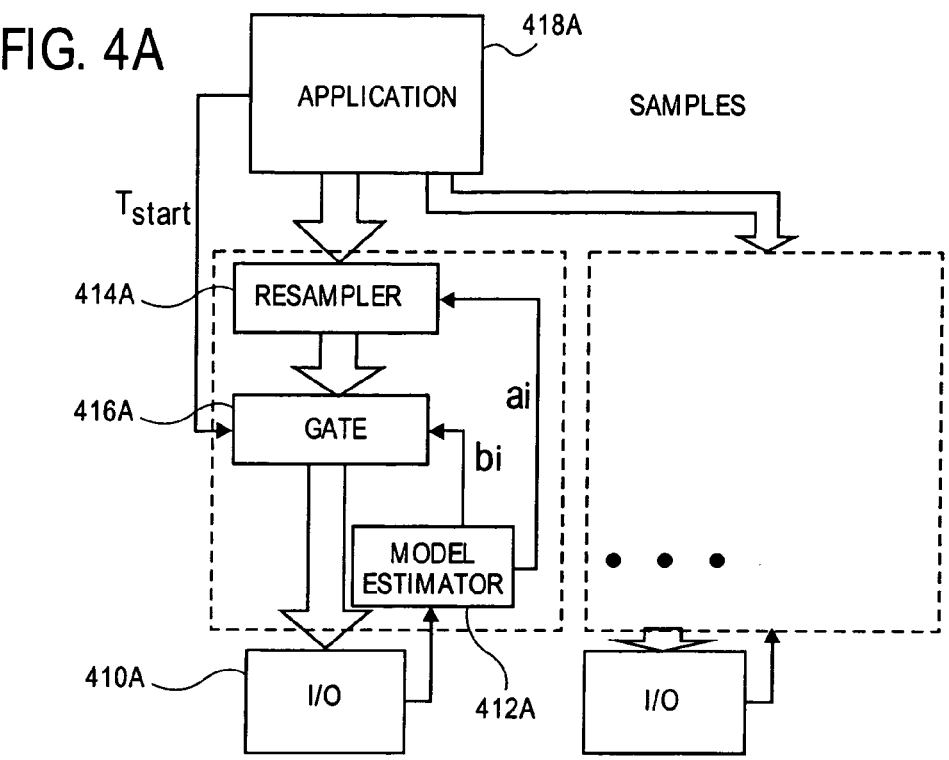
FIGS. 4a–b illustrate a system module to synchronize multimedia streams, in accordance with one embodiment.
Figure 4B:
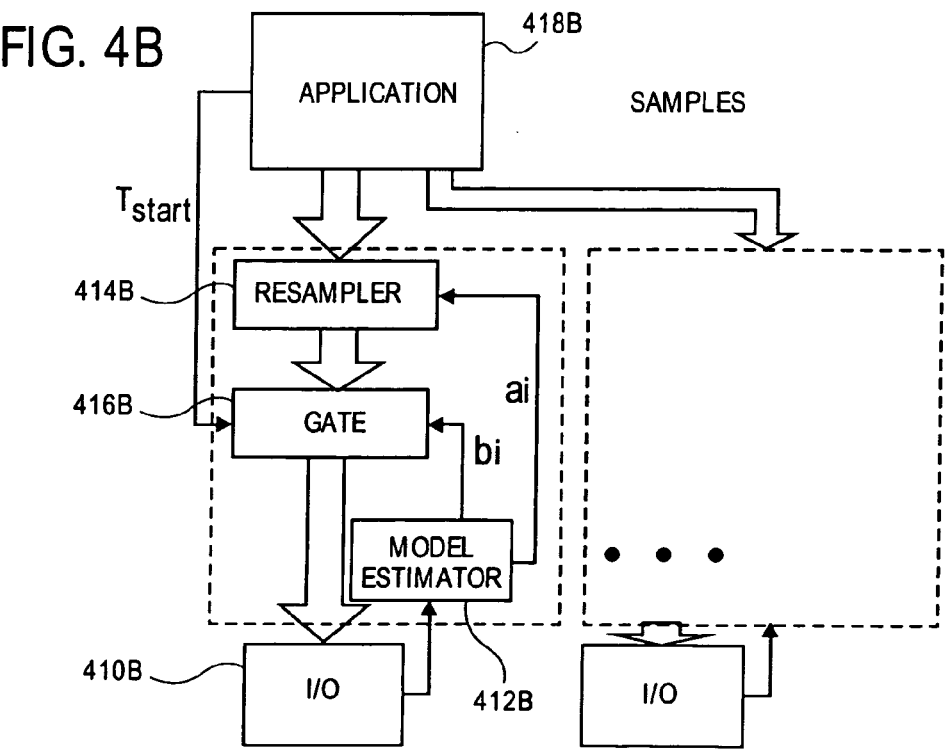

Using the parameter estimation techniques described above, in one embodiment, I/O streams may be synchronized (i.e. start simultaneously and have the same sample rate). The synchronization of the I/O streams may be performed by pre- or post-processing of the stream. FIG. 4a illustrates a system module to synchronize I/O streams to be played back, while FIG. 4b illustrates a system module to synchronize I/O streams that are being captured, in accordance with one embodiment. The modules, in one embodiment, consists of I/O hardware 410a–b; model estimator 412a–b; a re-sampler 414a–b that changes sampling frequency of stream; a gate 418a–b that is to pass-through or reject samples; and an application 428a–b that works with the synchronized stream.

Figure 5:
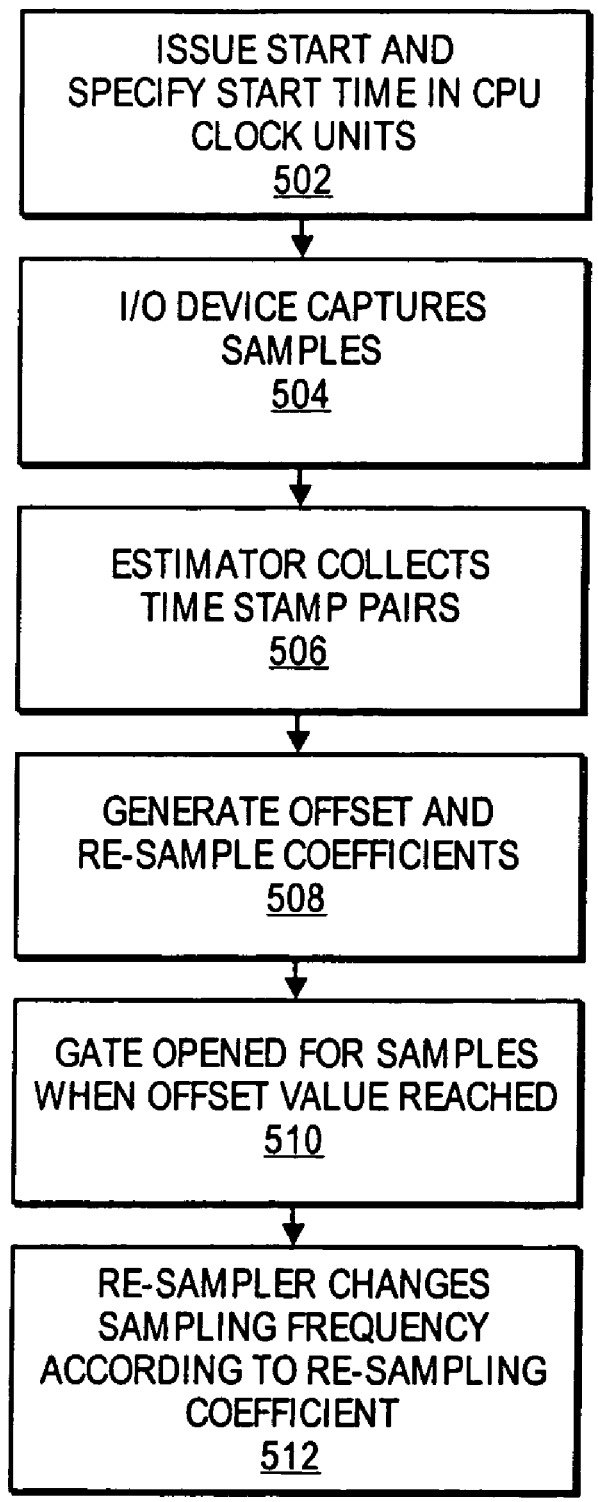
FIG. 5 illustrates a flow diagram describing the processes to synchronize a multimedia stream, in accordance with one embodiment.

FIG. 5 presents a flow diagram describing the processes to synchronize an input I/O stream, in accordance with one embodiment. The processes of the flow diagram of FIG. 5 are described with reference to the module of FIG. 4b. In process 502, the application 418b issues a start command and specifies the start time in CPU clock units. In process 504, the I/O device 410b starts capturing the multimedia stream ahead of time, but samples do not pass to the application 418b as the gate 416b is closed. In process 506, the estimator 412b collects observations (i.e., time stamp pairs) until the number of observations collected becomes sufficient for estimating model parameters.

In process 508, given CPU time, capture start time, and model parameters, an offset, in the multimedia stream corresponding to the first sample of the synchronized multimedia stream requested by application 418b, as well as the re-sampling coefficients, are calculated. In process 510, the gate 416*b* is opened when the offset in the I/O stream reaches offset value calculated in process 508. In process 512, the resampler 414*b* changes sampling frequency of the I/O stream according to the resampling coefficient calculated in process 508.

A related set of processes would be used to synchronize I/O streams that are to be played back, with appropriate variations to the processes for the operation of playing the I/O stream. In addition, in the case of one or more applications requesting multiple multimedia streams, in parallel, the streams may all be synchronized with the CPU clock, in accordance with the description above.

Whereas many alterations and modifications of the present invention will no doubt become apparent to a person of ordinary skill in the art after having read the foregoing description, it is to be understood that any particular embodiment shown and described by way of illustration is in no way intended to be considered limiting. For example, although much of the description herein references the multimedia stream as audio, the techniques described herein would also apply to video streams. Therefore, references to details of various embodiments are not intended to limit the scope of the claims which in themselves recite only those features regarded as essential to the invention.

What is claimed is:

1. A method comprising:
   an I/O device of a system receiving a multimedia stream as input, the I/O device having a I/O clock and the system having a system clock; and
   synchronizing samples of the stream with the system clock, wherein the synchronizing includes generating a timestamp of a sample of the multimedia stream with a corresponding time of the system clock; and generating a timing model parameter for the I/O device with the timestamp.

2. The method of claim 1, wherein the generating the timing model parameter includes generating the timing model parameter using a linear transition model that includes $t(\tau_i)=a_i(t)\tau_i+b_i(t)$, t is a value of the system clock and $\tau_i$ is a sample number of the multimedia stream at time t with a i-th device, and $a_i(t)$ and $b_i(t)$ are timing model parameters for the i-th device.

3. The method of claim 1, wherein the generating the timing model parameter includes generating the timing model parameter using a linear transition model that includes $\tau_i(t)=a_i(\tau_i)t+b_i(\tau_i)$, t is a value of the system clock and $\tau_i$ is a sample number of the multimedia stream at time t with a i-th device, and $a_i(t)$ and $b_i(t)$ are timigng model parameters for the i-th device.

4. The method of claim 1, wherein generating a timing model parameter for the I/O device includes generating a timing model parameter for multiple I/O devices.

5. The method of claim 4, wherein the generating the timing model parameter for multiple I/O devices includes using a least trimmed square regressions.

6. The method of claim 1, wherein the generating the timing model parameter for the I/O device with the timestamp is performed by an Interrupt Service Routine of a driver for the I/O device.

7. A method comprising:
   an I/O device of a system generating a multimedia stream as output, the I/O device having a I/O clock and the system having a system clock; and
   synchronizing samples of the stream with the system clock, wherein the synchronizing includes generating a timestamp of a sample of the multimedia stream with a corresponding time of the system clock; and generating a timing model parameter for the I/O device with the timestamp.

8. The method of claim 7, wherein the generating the timing model parameter includes generating the timing model parameter using a linear transition model that includes $t(\tau_i)=a_i(t)\tau_i+b_i(t)$, t is a value of the system clock and $\tau_i$ is a sample number of the multimedia stream at time t with a i-th device, and $a_i(t)$ and $b_i(t)$ are timing model parameters for the i-th device.

9. The method of claim 7, wherein the generating the timing model parameter includes generating the timing model parameter using a linear transition model that includes $\tau_i(t)=a_i(\tau_i)t+b_i(\tau_i)$, t is a value of the system clock and $\tau_i$ is a sample number of the multimedia stream at time t with a i-th device, and $a_i(t)$ and $b_i(t)$ are timing model parameters for the i-th device.

10. The method of claim 7, wherein generating a timing model parameter for the I/O device includes generating a timing model parameter for multiple I/O devices.

11. The method of claim 10, wherein the generating the timing model parameter for multiple I/O devices includes using a least trimmed square regressions.

12. The method of claim 7, wherein the generating the timing model parameter for the I/O device with the timestamp is performed by an Interrupt Service Routine of a driver for the I/O device.

13. A machine-readable medium having stored thereon a set of instructions which when executed cause a system to perform a method comprising of:
   an I/O device of a system receiving a multimedia stream as input, the I/O device having a I/O clock and the system having a system clock; and
   synchronizing samples of the stream with the system clock, wherein the synchronizing includes generating a timestamp of a sample of the multimedia stream with a corresponding time of the system clock; and generating a timing model parameter for the I/O device with the timestamp.

14. The machine-readable medium of claim 13, wherein the generating the timing model parameter includes generating the timing model parameter using a linear transition model that includes $t(\tau_i)=a_i(t)\tau_i+b_i(t)$, t is a value of the system clock and $\tau_i$ is a sample number of the multimedia stream at time t with a i-th device, and $a_i(t)$ and $b_i(t)$ are timing model parameters for the i-th device.

15. The machine-readable medium of claim 13, wherein the generating the timing model parameter includes generating the timing model parameter using a linear transition model that includes $\tau_i(t)=a_i(\tau_i)t+b_i(\tau_i)$, t is a value of the system clock and $\tau_i$ is a sample number of the multimedia stream at time t with a i-th device, and $a_i(t)$ and $b_i(t)$ are timing model parameters for the i-th device.

16. A machine-readable medium having stored thereon a set of instructions which when executed cause a system to perform a method comprising of:
   an I/O device of a system generating a multimedia stream as output, the I/O device having a I/O clock and the system having a system clock; and
   synchronizing samples of the stream with the system clock, wherein the synchronizing includes generating a timestamp of a sample of the multimedia stream with a corresponding time of the system clock; and generating a timing model parameter for the I/O device with the timestamp.

17. The machine-readable medium of claim 16, wherein the generating the timing model parameter includes generating the timing model parameter using a linear transition model that includes $t(\tau_i)=a_i(t)\tau_i+b_i(t)$, t is a value of the system clock and $\tau_i$ is a sample number of the multimedia stream at time t with a i-th device, and $a_i(t)$ and $b_i(t)$ are timing model parameters for the i-th device.

18. The machine-readable medium of claim 16, wherein the generating the timing model parameter includes generating the timing model parameter using a linear transition model that includes $\tau_i(t)=a_i(\tau_i)t+b_i(\tau_i)$, t is a value of the system clock and $\tau_i$ is a sample number of the multimedia stream at time t with a i-th device, and $a_i(t)$ and $b_i(t)$ are timing model parameters for the i-th device.

19. A system comprising:
a processor;
a wireless network interface coupled to the processor; and
a machine readable medium having stored thereon a set of instructions which when executed cause the system to perform a method comprising of:
an I/O device of a system receiving a multimedia stream as input, the I/O device having a I/O clock and the system having a system clock; and
synchronizing samples of the stream with the system clock, wherein the synchronizing includes generating a timestamp of a sample of the multimedia stream with a corresponding time of the system clock; and generating a timing model parameter for the I/O device with the timestamp.

20. The system of claim 19, wherein the generating the timing model parameter includes generating the timing model parameter using a linear transition model that includes $t(\tau_i)=a_i(t)\tau_i+b_i(t)$, t is a value of the system clock and $\tau_i$ is a sample number of the multimedia stream at time t with a i-th device, and $a_i(t)$ and $b_i(t)$ are timing model parameters for the i-th device.

21. The system of claim 19, wherein the generating the timing model parameter includes generating the timing model parameter using a linear transition model that includes $\tau_i(t)=a_i(\tau_i)t+b_i(\tau_i)$, t is a value of the system clock and $\tau_i$ is a sample number of the multimedia stream at time t with a i-th device, and $a_i(t)$ and $b_i(t)$ are timing model parameters for the i-th device.

22. A system comprising:
a processor;
a wireless network interface coupled to the processor; and
a machine readable medium having stored thereon a set of instructions which when executed cause the system to perform a method comprising of:
an I/O device of a system generating a multimedia stream as output, the I/O device having a I/O clock and the system having a system clock; and
synchronizing samples of the stream with the system clock, wherein the synchronizing includes generating a timestamp of a sample of the multimedia stream with a corresponding time of the system clock; and generating a timing model parameter for the I/O device with the timestamp.

23. The system of claim 22, wherein the generating the timing model parameter includes generating the timing model parameter using a linear transition model that includes $t(\tau_i)=a_i(t)\tau_i+b_i(t)$, t is a value of the system clock and $\tau_i$ is a sample number of the multimedia stream at time t with a i-th device, and $a_i(t)$ and $b_i(t)$ are timing model parameters for the i-th device.

24. The system of claim 22, wherein the generating the timing model parameter includes generating the timing model parameter using a linear transition model that includes $\tau_i(t)=a_i(\tau_i)t+b_i(\tau_i)$, t is a value of the system clock and $\tau_i$ is a sample number of the multimedia stream at time t with a i-th device, and $a_i(t)$ and $b_i(t)$ are timing model parameters for the i-th device.

* * * * *

UNITED STATES PATENT AND TRADEMARK OFFICE
CERTIFICATE OF CORRECTION

PATENT NO. : 7,197,658 B2 Page 1 of 1
APPLICATION NO. : 10/751035
DATED : March 27, 2007
INVENTOR(S) : Lienhart et al.

It is certified that error appears in the above-identified patent and that said Letters Patent is hereby corrected as shown below:

In column 7, at line 58, delete "times-" and insert --time---.

In column 7, at line 59, delete "tamp" and insert --stamp--.

In column 8, at line 25, delete "times-" and insert --time---.

In column 8, at line 26, delete "tamp" and insert --stamp--.

Signed and Sealed this

Twenty-ninth Day of April, 2008

JON W. DUDAS
*Director of the United States Patent and Trademark Office*